UNITED STATES PATENT OFFICE.

JAMES G. KELLY, OF SEDALIA, MISSOURI, ASSIGNOR OF ONE-HALF TO HOLMES HALL, OF SEDALIA, MISSOURI.

SOLDER FOR ALUMINUM.

1,321,529.     Specification of Letters Patent.     Patented Nov. 11, 1919.

No Drawing.     Application filed February 10, 1919. Serial No. 276,200.

*To all whom it may concern:*

Be it known that I, JAMES G. KELLY, a citizen of the United States, residing at the city of Sedalia, in the county of Pettis and State of Missouri, have invented certain new and useful Improvements in Solder for Aluminum, of which the following is a specification.

This invention consists in an improvement in solders for uniting aluminum, and can be used not only for uniting two parts both made of aluminum, but, also, two parts one of which is aluminum and the other of some other material, as, for instance, brass or copper.

Attempts have heretofore been made to produce a solder for joining aluminum parts, but the results have not been satisfactory. Moreover, in using prior aluminum solders, it has been necessary to soak in a suitable pickle the parts to be joined, which takes much time and delays the soldering process, besides involving the cost of the pickling material. In some instances, the parts to be joined by such prior solders have been painted with a suitable acid preparatory to soldering.

In the use of the invention forming the subject-matter hereof, the parts do not need to be prepared by either pickling or the use of acid. All that is necessary is that the adjoining ends or edges or parts shall be scraped clean with a suitable knife or scraper.

In using prior solders for aluminum, it has been necessary to use the oxy-acetylene welding process, but the solder of this invention can be used with an ordinary soldering iron, preferably heated as hot as possible and preferably to a substantial extent hotter than when used for soldering tin.

As is well known, the use of a flux for a solder is objectionable when such flux must be used separate from or preparatory to the use of the solder itself. This objection is entirely overcome in this present invention by incorporating a flux-like ingredient or flux-like ingredients in the solder itself. Thus, when this solder is melted, the flux-like ingredients melt first and prepare the way for the solder. Obviously, however, but one melting operation is necessary, which is the same melting operation that is essential to the use of the solder.

In this invention, when the soldering iron is applied to the solder, the ingredients which are hereinabove designated as the flux-like ingredients melt more readily than the metal ingredients in the solder, and the flux is thereby applied more readily and more evenly than before, and the solder itself will adhere more readily and more easily than before, without impairing the tensile strength of the joint.

It being understood that this invention is a combined solder and flux, the same is compounded as follows, the ingredients being in substantially the proportions herein named: melt fourteen ounces (14 oz.) of mutton tallow and add one pound (1 lb.) of stearic acid, the said stearic acid being in cake form and in appearance resembling paraffin, and continue the heat until the said mixture is thoroughly melted. Then, with the said mixture of mutton tallow and stearic acid still hot and fluid, add two (2) fluid ounces of skunk oil and stir the mixture of the three ingredients thoroughly for about two or three minutes. Then allow the same to cool until entirely cold. This compound is hereinafter called the flux mixture.

Next, melt fifteen ounces (15 oz.) of zinc. Then melt seventeen ounces (17 oz.) of lead, and then melt seventeen ounces (17 oz.) of block tin. Each of these articles is thoroughly stirred while being melted. After the said three (3) ingredients have been melted separately, then mix them together thoroughly for about four minutes, continuing the heat. Then add to this second mixture the one hundred and seventy (170) grains (apothecaries' weight) of the said first-mentioned or flux mixture and stir for a few seconds until the said flux mixture is melted, and then pour into molds and mold in the desired size and shape.

While the above is the preferred formula, yet the same has been used with satisfactory results with the addition thereto of one ounce (1 oz.) of aluminum.

Except where apothecaries' weight is herein referred to, it should be understood that avoirdupois weight is intended.

The blocks or sticks or chunks or pieces of solder prepared and formed as hereinabove described are used as follows:

First, the edges of the material which are to be soldered together are thoroughly cleaned, so as to remove all dirt and foreign substances.

Next, the soldering iron is heated to a degree of heat slightly higher than is ordinarily used in soldering tin or galvanized iron, which soldering iron should preferably be of about one and one-half (1½) or two (2) pounds weight.

Then the hot soldering iron is rubbed on sal ammoniac, to keep the iron clean and so that the iron can become properly tinned.

The said aluminum solder is then applied to the parts to be united with the soldering iron used in the usual way and the soldering iron being frequently rubbed over the sal ammoniac, to keep the iron thoroughly tinned. These operations should be continued until the parts to be soldered are thoroughly tinned or covered with the aluminum solder. If the parts to be soldered together are light and no great strain is to be put upon them when soldered together, the work can be finished by using common solder and in the usual way. If, however, the parts to be soldered need to be very strong, the job should be finished with this aluminum solder.

Of course, it will be understod that the ordinary solder will not stick to aluminum, but, after the above-described aluminum solder has been applied to aluminum, ordinary solder for tin will stick to it.

If desired, a blow-pipe or oxy-acetylene welding apparatus may be used after the parts to be joined have been tinned as above described by the use of the iron.

The method of melting this solder at the joint is the same as practised with any other solder. On account of the ingredients of this article and the method in which they are combined together, the resultant joint is stronger than the aluminum itself.

It is well known that lead will not unite with certain substances, as, for instance, aluminum, but it has been found in practice that this solder can be used to prepare the surface of aluminum for union with lead where that is desired, in which use of this solder the aluminum is first tinned with this solder and thereupon ordinary soft solder can be used to form a union with the said tinned part of the aluminum article, there being no antipathy of the lead in the soft solder to union with this solder.

In this article the zinc is used for strength and the tin for its more readily fusible quality.

I claim:

1. A solder for aluminum consisting of zinc, lead, and block tin, and a flux-like ingredient including stearic acid, mutton-tallow and skunk-oil, all thoroughly admixed with the foregoing elements in the proportions substantially as specified.

2. A solder for aluminum consisting of zinc, lead, and block tin, and a flux-like ingredient including skunk-oil, the elements all being amalgamated in the proportions substantially as specified.

3. A solder for aluminum consisting of zinc, lead, block tin, a small proportion of aluminum, and a flux-like ingredient embodied in the said solder consisting of substantially equal parts of mutton tallow and stearic acid and a small proportion of skunk oil.

4. A solder for aluminum consisting of zinc, lead, block tin, a small proportion of aluminum, and a flux-like ingredient embodied in the said solder consisting of substantially equal parts of mutton tallow and stearic acid and a small proportion of skunk oil, the said flux-like ingredient being in any proportion to the whole of the said solder.

5. A solder for aluminum consisting of zinc, lead, and block tin, and a flux-like ingredient containing forty-three and seventy-five hundredths per cent. (43.75%) of mutton tallow, fifty per cent. (50%) of stearic acid, and six and twenty-five hundredths per cent. (6.25%) of skunk oil, said flux being thoroughly admixed.

6. A solder for aluminum consisting of zinc, lead, block tin, and a flux-like ingredient containing stearic acid and mutton tallow in substantially equal portions, and a small amount of skunk oil, the whole being thoroughly admixed while being heated.

In testimony whereof I hereunto affix my signature.

JAMES G. KELLY.